United States Patent [19]

Webb

[11] 4,392,957

[45] Jul. 12, 1983

[54] ANTI-POLLUTION EQUIPMENT

[75] Inventor: Michael G. Webb, Wootton Bridge, England

[73] Assignee: Vikoma International Limited, Isle of Wight, England

[21] Appl. No.: 281,932

[22] Filed: Jul. 10, 1981

Related U.S. Application Data

[63] Continuation-in-part of Ser. No. 125,515, Feb. 28, 1980, abandoned.

[30] Foreign Application Priority Data

Mar. 6, 1979 [GB] United Kingdom ................. 7907834

[51] Int. Cl.³ .............................................. B01D 17/00
[52] U.S. Cl. .................................. 210/241; 210/242.3; 210/923; 294/69 R
[58] Field of Search .................. 210/923, 242.3, 242.4, 210/153, 154, 155, 162, 241; 294/87.22, 69 R

[56] References Cited

U.S. PATENT DOCUMENTS

| 1,699,828 | 1/1929 | Wyckoff | 210/154 |
| 2,600,467 | 6/1952 | Bowler | 294/69 R |
| 3,499,291 | 3/1970 | Mikkelsen | 210/924 |
| 3,762,556 | 10/1973 | Penton | 210/242.3 |
| 3,797,878 | 3/1974 | Fagre et al. | 294/69 R |

FOREIGN PATENT DOCUMENTS

| 984478 | 2/1965 | United Kingdom | 210/154 |
| 1188156 | 4/1970 | United Kingdom | 210/242.3 |
| 2013583A | 8/1979 | United Kingdom | 210/242.3 |

Primary Examiner—Charles N. Hart
Assistant Examiner—John W. Czaja
Attorney, Agent, or Firm—Morgan, Finnegan, Pine, Foley & Lee

[57] ABSTRACT

A device suitable for recovering viscous material derived from petroleum, comprises a plurality of pairs of blades (1 and 2, 3 and 4, 5 and 6) each blade (1, 2, 3, 4, 5, 6) being pivotally mounted at either end, and the pivots on at least one end being connected to an actuating rod or rods, (11, 12, 13, 14). The blades and rods are arranged so that in a first position the pairs of blades are vertical, in a second position they form V-shaped containers (21, 23, 25) and in a third position the blades are again in pairs, which are either the same or different pairs from the original position.

4 Claims, 10 Drawing Figures

ANTI-POLLUTION EQUIPMENT

This is a continuation-in-part of U.S. patent application Ser. No. 125,515, filed Feb. 28, 1980, now abandoned.

This invention relates to a device for picking up cold heavy fuel oil and thick "chocolate mousse".

When crude petroleum or petroleum products are transported there is a risk of accidental spillage or unauthorised discharge taking place. If this happens at sea or on an inland waterway, the water is liable to become polluted by oil. In recent years several instances of pollution caused by collisions or groundings of tankers have occurred.

Recovering oil from water in these circumstances is a difficult operation.

Numerous proposals have been made for the containment and recovery of such spilt oil.

For example, British patent specification No. 1,188,156 describes a barrier which comprises one or more air chambers and one or more water chambers, all the walls of the chambers being formed of flexible material, the chambers being so positioned that when suitably inflated with air and water the barrier will float with part below and part above the water surface so as to impede the passage of floating oil. Such a barrier is very effective for forming a corral within which the oil can be collected. The collected oil is then removed by a skimming device.

Another proposal set out in the published British patent application No. 2,013,583 discloses a barrier for the containment and recovery of oil spilt on water, the barrier comprising an elongate, flexible, buoyant, inflatable air chamber having a plurality of sections of reduced diameter; an elongate, flexible, inflatable ballast water chamber; an elongate, flexible oil and water discharge tube; and an elongate membrane, one end of the membrane being connected to the exterior of the air chamber and the other to the exterior of the ballast water chamber or the oil and water discharge tube to form a gallery; the buoyant air chamber and the oil and water discharge tube being joined to the ballast water chamber in side-by-side relationship; the chambers, tube and membrane being so positioned relative to one another that when in use on oil polluted water the buoyant air chamber and the ballast water chamber together form a barrier for oil spilt on water except in the sections of reduced diameter of the buoyant air chamber; these sections and the ballast water chamber defining a series of weirs for oil and water to pass into the gallery; the oil and water discharge tube being provided with means to remove oil and water from the gallery.

Both types of recovery can be effective when dealing with mobile liquids such as freshly spilt crude oil or light to medium petroleum products. If, however, the pollutant is a heavy fuel oil or a crude which has been allowed to weather and lose its lighter components and/or form a thick "chocolate mousse" the problem of recovery becomes much greater since such materials cannot be skimmed or pumped.

At sea, mechanical grabs have been proposed for their recovery, but grabs are rarely available in the required place at the required time and they are also very difficult to deploy. In addition, oil recovered by such means will be associated with large quantities of water.

On shore, the most common method of recovery is by labourers using shovels and buckets, a method which is tedious and expensive.

We have now invented a device suitable for recovering layers of heavy materials of high viscosity derived from petroleum.

Thus according to the present invention their is provided a device suitable for recovering viscous material derived from petroleum, the device comprising a plurality of pairs of blades, each blade being pivotally mounted at either end, and the pivots on at least one end being connected to an actuating rod or rods so that the position of the pivots can be moved substantially at right angles to the width of the blades, the blades and rods being arranged to operate in such a manner that in a first position, the pairs of blades are in a vertical position, adjacent to one another but remote from other pairs, in a second position the blades form a series of V-shaped containers and in a third position the blades are again in vertical pairs, either in the same or in different pairs from the original position.

The terms "pivotally mounted" or "pivotally connected" are to be taken to include arrangements having an equivalent effect to mounting the blades on pivots. For example, the term is to include an arrangement in which a blade is pivotally mounted at a first end by means of a pivot pin and is slideably mounted at its second end between two or more pins so that moving the pins transversely to the width of the blade rotates the first end about its pivot pin and rotates the second end as if it were in fact mounted on a pivot pin.

In a preferred embodiment, the pivots at both ends are connected to actuating rods so that both sets of pivots can be moved. There may for example be two actuating rods at each end, the rods being connected to alternate pivots.

Thus, in a preferred embodiment the upper end of one member of each pair of blades is pivotally connected to a first actuating rod, the upper end of the second member of each pair is pivotally connected to a second actuating rod, the lower end of each blade connected to the first actuating rod is pivotally connected to a third actuating rod and the lower end of each blade connected to the second actuating rod is pivotally connected to a fourth actuating rod.

Assuming that the blades are initially positioned in pairs, i.e. the first position hereinbefore mentioned, moving the first and second rods in opposed directions causes the blades to pivot on their lower edges and open into a series of V-shaped containers, i.e. the second position. Keeping the first and second rods in the new position and moving the third and fourth rods in opposing directions causes the blades to pivot on their upper edges and open bases of the containers. The blades are again positioned in vertical pairs, although they may be in different pairs from the original position.

By reversing the procedure the containers can again be formed and unformed and the original pairs regained.

In an alternative and simpler embodiment, the upper pivots are not transversely moveable. They can be kept in position by connection to an immovable rod or by attachment to a suitable framework. The lower pivots have actuating rods equivalent to the third and fourth actuating rods of the first embodiment. The sequence of operations with this embodiment is as follows.

The first position is as before with the blades in vertical pairs and preferably with a single blade at either extremity. The lower pivots are then moved by the actuating rods to form a series of V-shaped containers equivalent to the second position. To open the containers the movement of the actuating rods is reversed and the blades return to their original positions.

Where there is more than one actuating rod at the ends of the blades, the rods are preferably positioned one slightly above another so that they may be moved without impeding the movement of the other rods.

The device is particularly suitable for removing patches of thick semi-solid fluids such as heavy fuel oil and "chocolate mousse" on awkward sites or off beaches.

To use the device on polluted water it is set with the blades in the vertical position and dropped onto the material to be removed. The weight of the device causes the blades to cut through the material until they reach the water underneath it. The rods are then actuated to form the V-shaped containers and the device is pulled upwards through the material, filling the containers with the material as it rises. Water drains through gaps deliberately left at the apices of the V's. The device is then raised above the material, positioned over a collecting vessel and the appropriate rods actuated to open the containers and release the material.

Floats may be attached to the device to prevent it from sinking too deeply in the water.

The blades may be of any suitable length and width and may be spaced apart at any convenient distance. Typical dimensions for the preferred embodiment are:

| | |
|---|---|
| Blade length (i.e. the length of a side of a V-shaped container) | 15 cm |
| Blade width | 120 cm |
| Spacing between adjacent pairs of blades | 10 cm |
| Spacing between the lower edges of the blades forming a V-shaped container | 0.5 cm |

The invention is illustrated with reference to the accompanying drawings FIGS. 1 to 10 in which FIGS. 1 to 3 illustrate the principle of operation of a device according to the present invention and FIGS. 4 to 10 illustrate a preferred embodiment of a device according to the present invention.

Figure 1:
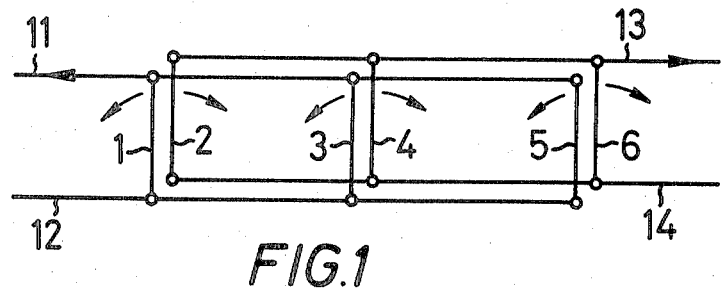
FIGS. 1 to 3 are schematic representations of the blades and actuating rods of the present invention in the first, second and third positions.
Figure 2:
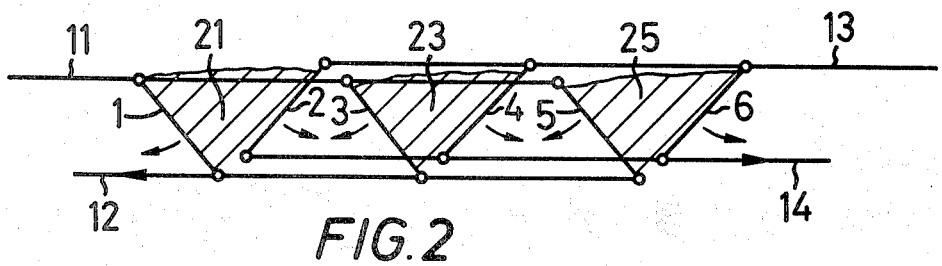
Figure 3:
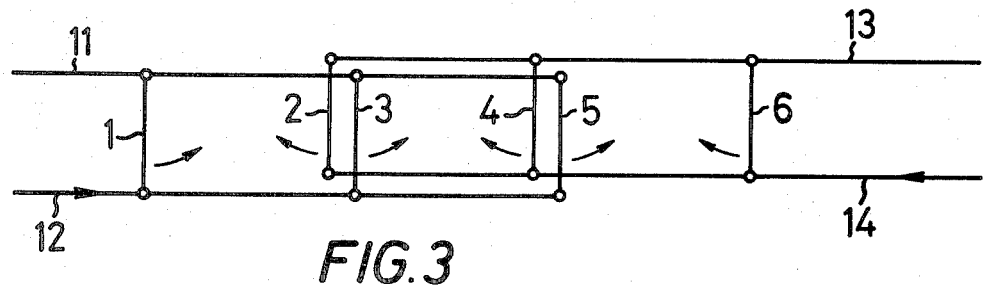

Considering first the preferred embodiment in which the blades are pivotally connected at both ends to actuating rods as illustrated by FIGS. 1 to 3. FIG. 1 shows the device in the first position, FIG. 2 in the second position and FIG. 3 in the third.

As illustrated in FIGS. 1 to 3 the device comprises a number of blades, 1,2,3,4,5,6 etc. arranged in pairs as shown.

Blades 1,3,5, etc. are pivotally mounted at their upper ends to rod 11 and at their lower ends to rod 12. Blades 2, 4, 6, etc. are pivotally mounted at their upper ends to rod 13 and at their lower ends to rod 14.

The device is shown at the first position in FIG. 1. If lower rods 12 and 14 then remain in position and upper rods 11 and 13 are moved apart, the blades pivot on their lower edges and diverge to form receptacles 21,23,25, etc. formed by blades 1 and 2,3 and 4, 5 and 6.

To open the receptacles and discharge their contents, upper rods 11 and 13 remain in position and lower rods 12 and 14 are moved apart. The blades then pivot on their upper edges and converge to form new pairs 2 and 3, 4 and 5, etc. with single blades at either extremity.

The above procedure may then be reversed with similar effects.

In the second embodiment in which the upper pivots are not transversely moveable the upper actuating rods 11 and 13 of FIGS. 1 to 3 may be replaced by a single, fixed rod. Alternatively, the upper actuating rods may be present but not used.

The first position is the same as shown in FIG. 3. To obtain the second position, shown in FIG. 2, the lower rather than the upper pivots are moved so that the V-shaped containers 21, 23, 25 are formed by the blades 1 and 2, 3 and 4, 5 and 6. Therefore, in this embodiment, the pairs of blades which form the V-shaped containers are the spaced apart pairs of blades rather than the closely spaced blades, and hence the preferment for a single blade at either end of the series of pairs of blades.

The third position is obtained by reversing the movement of the rods 12 and 14 to return the blades to the first position of FIG. 3.

A preferred embodiment of the device according to the present invention will now be described with reference to FIGS. 4 to 10.

Figure 4:
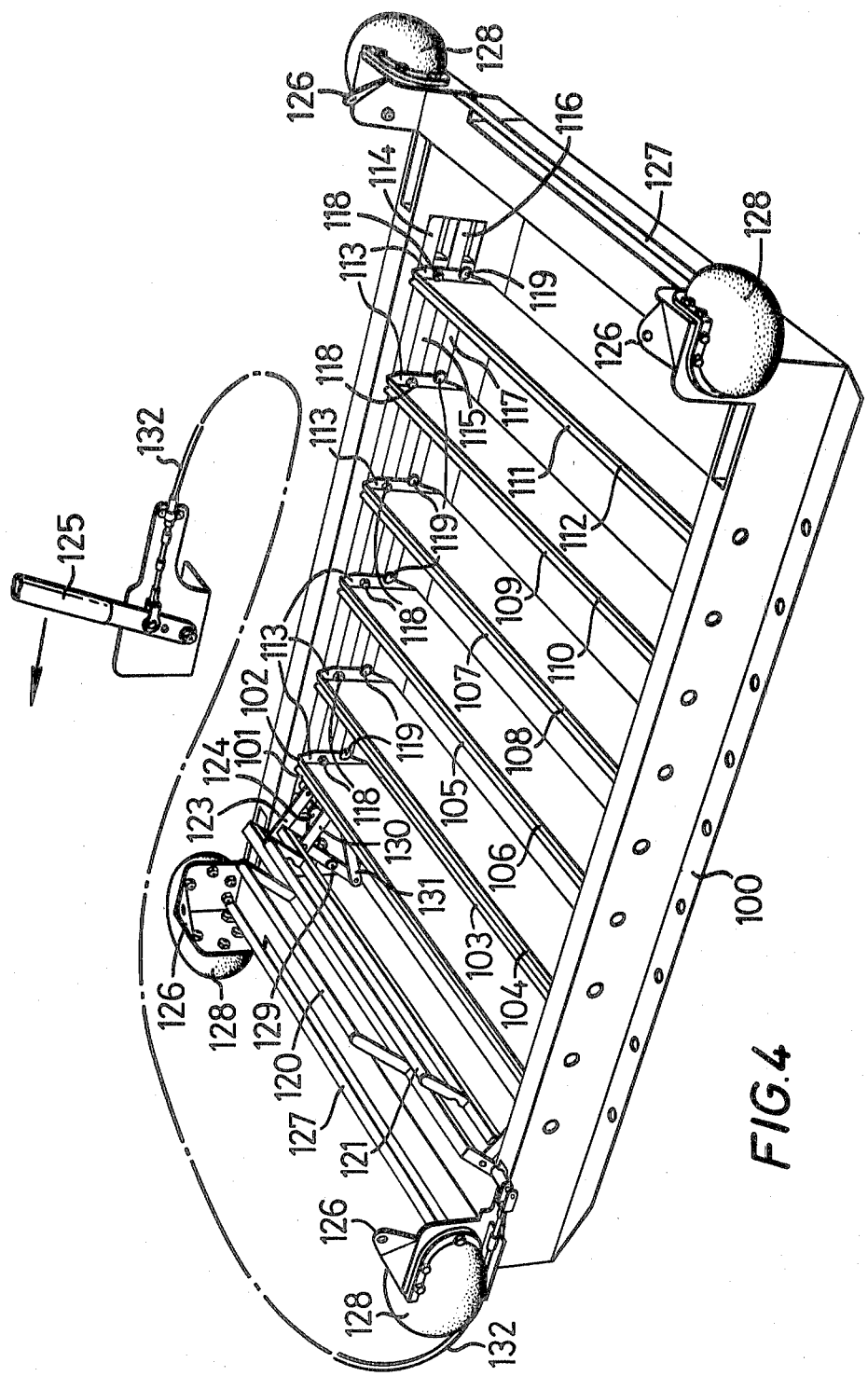
FIG. 4 is a perspective view of a preferred embodiment of the device according to the present invention showing the blades in the first position for entry into oil polluted water.

The device shown in FIG. 4 comprises a rectangular framework 100 with twelve blades 101 to 112 mounted across the width of the framework.

The rectangular blades are in pairs and arranged in the first position i.e. they are in an upright position adjacent to each other but remote from neighbouring pairs. (See FIG. 7). The upper edge of each blade is turned out away from the blade with which it is paired and each blade has a mounting tab 113 at each end of the blade. These tabs are transverse to the width of the blades and are on the side of the blade away from the adjacent blade. Since the blade may conveniently be made from sheet metal, they may be of folded construction. Alternatively the tabs may be welded or otherwise attached to the blades.

The blades are mounted at each end to actuating rods. There are four actuating rods along opposite sides of the framework 100 but only the rods 114 to 117 on one side of the device can be seen in FIG. 4. The method of attaching the blades 102, 104, 106, 108, 110 and 112 to the actuating rods 114 to 117 can be seen from FIG. 4. Each of the even numbered blades is pivotally attached near to the upper edge of the blade by a bolt 118 to the actuating rod 115. Each blade is retained near to its lower edge by a large headed pin 119 and a plain pin (not shown) which are mounted in actuating rod 117. The mounting tab 113 of each of the blades is retained between the head of pin 119 and the actuating rod 117. This arrangement allows the lower part of the blade to slide between the pin 119 and the plain pin and hence to be rotated about its lower edge. The lower part of the tab 113 is particularly shaped to facilitate this movement. The odd numbered blades 101, 103, 105, 107, 109 and 111 are similarly attached to two of the four actuating rods on each side of the framework 100. The upper edge of each of the odd numbered blades is pivotally attached by a bolt (not shown) through the mounting tab (not shown) to actuating rod 114 and the lower edge is slideably retained between a large headed pin and a plain pin (not shown) mounted in actuating rod 116. Each blade is mounted to two of the four actuating rods on the opposite side of the framework 100, in the same manner. Thus, each blade is pivotally mounted between two pairs of blades.

Figure 10:
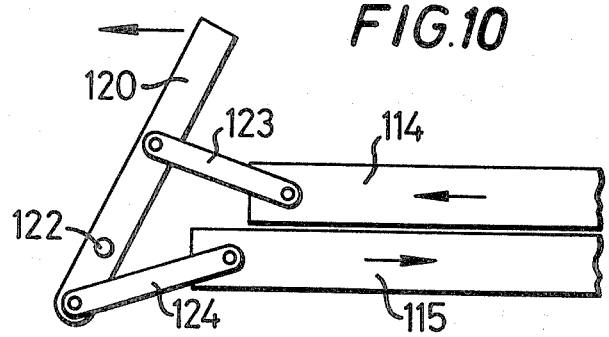
FIG. 10 is a schematic representation of the mechanism for moving the actuating rods.

The blades 101 to 112 are positioned by moving the actuating rods transversely to the width of the blades. Thus the actuating rods are slideably mounted in the framework 100 and connected to handles 120 and 121. Each handle controls two actuating rods on each side of the framework 100. Handle 120 controls the upper two actuating rods 114 and 115 and handle 121 controls the lower two actuating rods 116 and 117. FIG. 10 is a schematic representation of handle 120 and illustrates how the handles move the actuating rods. The handle 120 is rotatably mounted in the framework 100 so that it may rotate about axis 122. The handle 120 is connected to the actuating rods 114 and 115 by two arms 123 and 124. Arm 123 is pivotally connected at one end to actuating rod 114 and pivotally connected at the other end to the handle 120 above the axis of rotation 122. Arm 124 is pivotally connected at one end to the actuating rod 115 and pivotally connected at the other end to the handle 120 below the axis of rotation 122. When the handle 120 is pulled back i.e. rotated in an anti-clockwise direction about the axis 122 the upper actuating rod 114 is moved to the left and the lower actuating rod 115 is moved to the right as indicated by the arrows.

Handle 121 is similar to handle 120 and is pivotally mounted at 129 with its upper arm pivotally connected to actuating rod 116 and its lower arm 131 pivotally connected to rod 117. In FIG. 4 both handles are in the forward position which arranges the blades in the first position.

A remote lever 125 is also illustrated in FIG. 4. This lever may be used to move handle 120 and its operation will be considered later in relation to the method of using the device.

The device illustrated in FIG. 4 has a bracket 126 in each corner by which the device may be attached to a crane or hoist. At each end of the device is a bar 127 by which the device may be lifted or manoeuvred manually. There is also a float 128 in each corner.

The method of using the preferred embodiment of the device will be described with reference to the accompanying drawings FIGS. 4 to 10.

The device may be used manually but preferably a mechanical hoist or crane is used. The device may be attached to the hoist or crane by the corner brackets 126.

Figure 7:
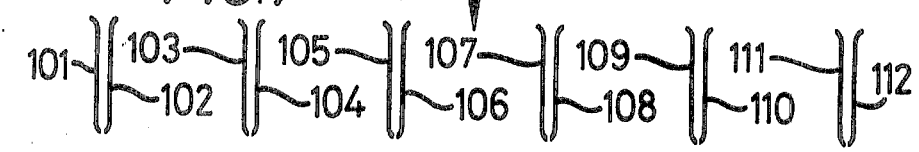
FIGS. 7, 8 and 9 are schematic representations of the blades viewed in cross section illustrating the relative positions of the blades in FIGS. 4, 5 and 6 respectively.

The blades are set in the first position as illustrated in FIG. 7 by pushing forward both handles 120 and 121 as shown in FIG. 4. The device is then raised by the hoist, swung out over the oil polluted water, and then lowered down through the surface of the water. The floats 128 are intended to prevent the device sinking too far into the water. However, in some cases the polluted oil may be so viscous that the device is not heavy enough to penetrate the oil. In such cases it may be necessary to increase the weight of the device. This may be done by fixing weights e.g. chains around the framework. Alternatively the framework may comprise a series of tanks which can be filled with water to increase the weight of the device as necessary.

Figure 5:
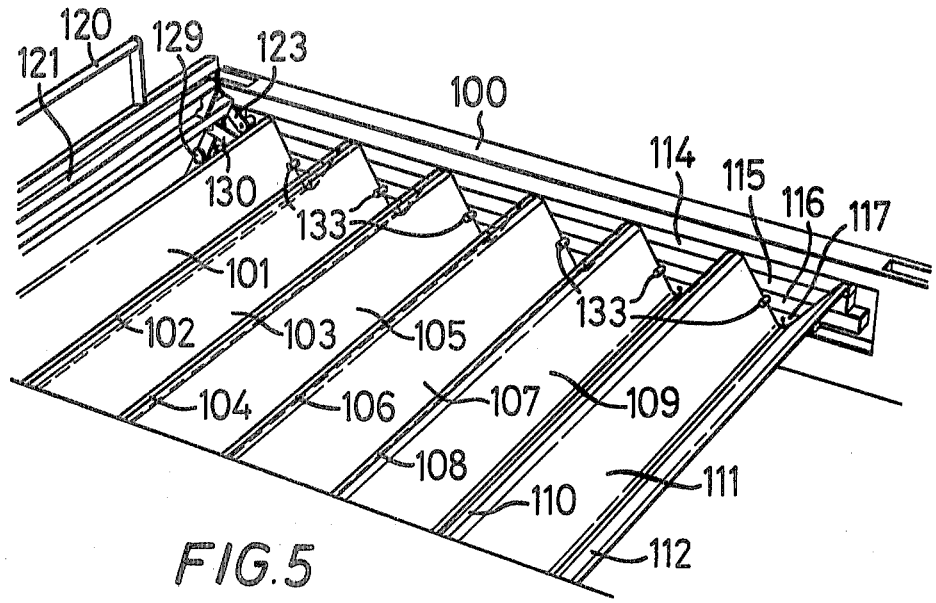
FIG. 5 is a perspective view of part of the device illustrated in FIG. 4 showing the blades in the second position forming V-shaped containers for oil floating on the surface of water.
Figure 8:
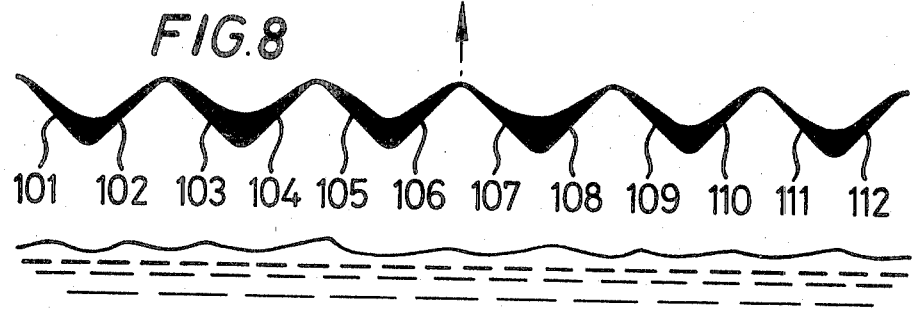

When the blades are below the viscous oil, the rods are actuated to move the blades into the second position to form V-shaped containers as shown in FIGS. 5 and 8. Preferably the V-shaped containers are formed just below the interface between the oil and water so that the out-turned upper edges of the blades form weirs over which the oil and water pass into the V-shaped containers.

The V-shaped containers are formed by pulling back the handle 120 i.e. rotating the handle in an anti-clockwise direction about its centre of rotation. As shown in FIG. 10 and described above, this movement of the handle 120 moves actuating rod 114 to the left in the Figures and rod 115 to the right. Since the upper parts of the odd numbered blades are pivotally attached to rod 114 and the upper parts of the even numbered blades are pivotally attached to rod 115, pulling back handle 120 causes the upper parts of the blades in each pair to diverge. The upper part of each blade rotates about the pivot bolt while the lower part slides between the two retaining pins.

The handle may be pulled back manually. However, if the device is deployed over the side of a vessel or from a dockside by a crane or hoist some means of remotely operating the handle may be required. The means shown in FIG. 4 is a simple lever 125. The lever would be mounted on board the vessel or on the dockside and connected to the handle 120 by a cable 132 slideably mounted on the hoist or crane. Moving the lever in the direction indicated by the arrow in FIG. 4 would pull back the handle 120. Alternative means of remotely controlling the handle may be, for example, a hydraulically powered ram.

As the device is pulled up out of the water, water drains from the V-shaped containers through the gaps left at the apices of the V's. The lower edge of each blade may be turned in towards the blade with which it is paired if a narrow gap is required at the apices of the V-shaped containers.

Figure 6:
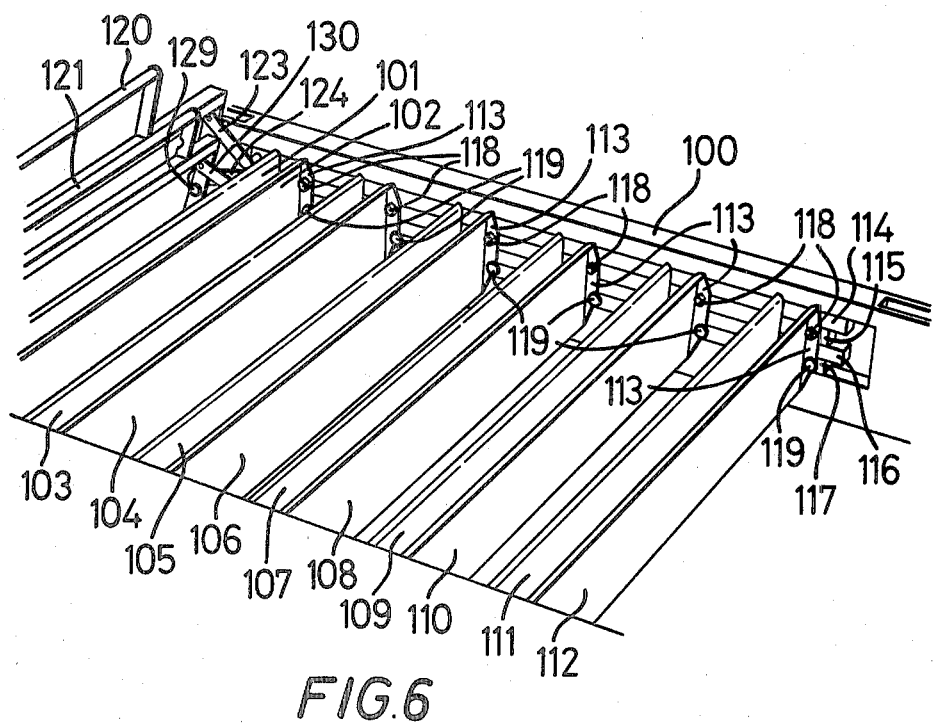
FIG. 6 is a perspective view of part of the device illustrated in FIG. 4 showing the blades in the third position to allow collected oil to fall out of the device.
Figure 9:
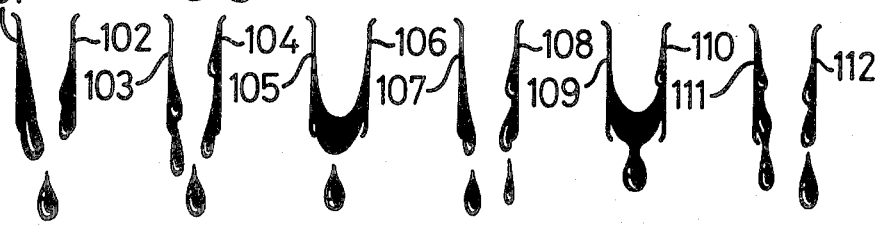

The loaded device is positioned over a collection area and the blades moved into the third position to allow the oil and water to fall out of the V-shaped containers. FIGS. 6 and 9 show the blades in this third position which is achieved by pulling back handle 121 i.e. rotating it in an anti-clockwise direction about its axis of rotation 129. This movement of handle 121 moves rods 115 and 116 in the same manner as for handle 120 and shown in FIG. 7. The plain pins 133 on rod 116 shown in FIG. 5 push against the lower part of the odd numbered blades and the plane pins on rod 117 (not shown) push against the lower part of the even numbered blades. Thus the lower parts of the blades are made to diverge. The geometry of this particular embodiment also causes the upper actuating rods to move resulting in the upper parts of the blades converging slightly. In the third position the blades are in an upright position as in the first position but each blade is spaced apart from the blade with which it is paired when in the first position.

Handle 121 may be pulled back manually or may be operated remotely in the same manner as for handle 120.

In order to return the blades to the first position both handles must be pushed forward thereby reversing the sequence of movements of the actuating rods to return the blades to their original upright position with each pair of blades remote from neighbouring pairs.

I claim:

1. A device suitable for recovering viscous material derived from petroleum comprises a plurality of pairs of blades, each blade being pivotally mounted at either end, and the pivots on at least one end being connected to an actuating rod or rods, so that the position of the pivots can be moved substantially at right angles to the width of the blades, the blades and rods being arranged to operate in such a manner that in a first position, the pairs of blades are in a vertical position, adjacent to one another but remote from other pairs, in a second position the blades form a series of V-shaped containers and in a third position the blades are again in vertical pairs, either in the same or in different pairs from the original position.

2. A device as claimed in claim 1 in which the upper end of each pair of blades is pivotally connected to a first actuating rod, the upper end of the second member of each pair is pivotally connected to a second actuating rod, the lower end of each blade connected to the first actuating rod is pivotally connected to a third actuating rod and the lower end of each blade connected to the second actuating rod is pivotally connected to a fourth actuating rod.

3. A device as claimed in claim 1 in which each blade, is mounted between two pairs of actuating rods, the upper end of one member of each pair of blades is pivotally connected at either side of the blade to one of a first pair of actuating rods, the upper end of the second member of each pair of blades is pivotally connected at either side of the blade to one of a second pair of actuating rods, the lower end of each of the blades connected to the first pair of actuating rods is pivotally connected at either side of the blade to one of a third pair of actuating rods and the lower end of each of the blades connected to the second pair of actuating rods is pivotally connected at either side of the blade to one of a fourth pair of actuating rods.

4. A device as claimed in claim 1 in which the upper edges of all the blades are pivotally connected to a single immovable rod.

* * * * *